United States Patent [19]

Jansen

[11] 4,262,887
[45] Apr. 21, 1981

[54] FRICTION SPRING UNIT

[75] Inventor: Harry Jansen, Moers, Fed. Rep. of Germany

[73] Assignee: Ringfeder GmbH, Krefeld-Uerdingen, Fed. Rep. of Germany

[21] Appl. No.: 44,548

[22] Filed: Jun. 1, 1979

[30] Foreign Application Priority Data

May 4, 1979 [DE] Fed. Rep. of Germany ....... 2918091

[51] Int. Cl.³ .............................................. F16F 1/06
[52] U.S. Cl. ..................... 267/9 A; 213/29; 213/32 R; 267/138; 267/168; 267/169; 267/177
[58] Field of Search .............. 267/138, 139, 168, 169, 267/177, 9 R, 9 A, 9 B; 213/29, 30, 32 R, 32 A; 293/137

[56] References Cited

U.S. PATENT DOCUMENTS

| 2,128,505 | 8/1938 | Sproul | 267/9 A |
|---|---|---|---|
| 2,189,208 | 2/1940 | Holland | 267/9 B |
| 2,448,138 | 8/1948 | Dath | 267/9 A X |
| 2,508,347 | 5/1950 | Marsh | 293/137 X |
| 3,164,263 | 1/1965 | Novikov et al. | 267/9 B X |
| 3,536,314 | 10/1970 | Tonne et al. | |
| 3,744,123 | 7/1973 | Vers | 188/322 X |
| 3,790,146 | 2/1974 | Hoffmann et al. | 188/322 X |
| 4,143,898 | 3/1979 | Klaus et al. | 213/221 X |

FOREIGN PATENT DOCUMENTS

| 878452 | 6/1953 | Fed. Rep. of Germany | 267/9 B |
|---|---|---|---|
| 1286818 | 1/1969 | Fed. Rep. of Germany | |
| 1455255 | 3/1969 | Fed. Rep. of Germany | |
| 1455238 | 4/1969 | Fed. Rep. of Germany | |
| 1455252 | 1/1970 | Fed. Rep. of Germany | |
| 2707358 | 8/1978 | Fed. Rep. of Germany | |
| 1809135 | 3/1979 | Fed. Rep. of Germany | 267/9 A |

OTHER PUBLICATIONS

Reibungsfeder Bauart Ringfeder DBP, mit Hülsenpuffer, Mai. 1972, C 1059.400.6.

Primary Examiner—George E. A. Halvosa
Attorney, Agent, or Firm—Michael J. Striker

[57] ABSTRACT

A friction spring unit has a friction spring including a plurality of inner rings and outer rings whose conical surfaces cooperate with each other with interposition of a lubricant, and an outer casing element and an inner casing element which shield the friction spring from outside and inside, respectively. The rings of the friction spring which are located at axial ends of the latter are sealingly connected with the inner casing element and the outer casing element. This sealing connection may be performed by interengaging beads and grooves, or flange-like projections and supports. The casing elements may be formed as hoses or each may be composed of at least two telescopable sleeves.

15 Claims, 9 Drawing Figures

FRICTION SPRING UNIT

BACKGROUND OF THE INVENTION

The present invention relates to a friction spring unit, particularly for sleeve buffers or push-pull devices of intermediate buffer coupling for rail vehicles.

Friction springs of the above-mentioned application have a plurality of inner rings and outer rings whose conical contact surfaces cooperate with each other with interposition of a lubricant, such as a grease. Such friction springs are known for a long time as components of machines (for example, the friction springs disclosed in the German Pat. No. 1,286,818 or in the U.S. Pat. No. 3,536,314) and are generally utilized in machine-building industry as springs for sleeve buffers of rail vehicles (as disclosed, for example, in the prospectus of "Ringfeder GmbH", C 1059.400.6, issued in May 1972). The friction springs are further utilized in push-pull devices of intermediate buffer couplings which correspond to the regulations of the International Railway Union UIC as disclosed, for example, in the German Pat. Nos. 1,455,252 and 1,455,255 and in the German Offenlegungsschrift No. 2,707,358).

The known friction springs are characterized by high static and dynamic loading capacity and great damping power, and at the same time their service life practically corresponds to the service life of a rail vehicle. In order to attain these properties, dust and moisture must be kept far from the friction spring and its lubricant. It has been recognized from practice that conventional structural parts of the friction spring which receive the latter and serve for transmitting forces, such as buffer sleeves and buffer plungers of sleeve buffers or comparable housings of push-pull devices, not always attain these objects.

SUMMARY OF THE INVENTION

Accordingly, it is an object of the present invention to provide a friction spring unit which avoids the disadvantages of the prior art.

More particularly, it is an object of the present invention to provide a friction spring unit having means protecting a friction spring from dust and moisture, which means has a simple construction and is inexpensive to manufacture and, at the same time, is so formed and located that the length of the unit and particularly its outer diameter are not changed.

In keeping with these objects and with others which will become apparent hereinafter, one feature of the present invention resides, briefly stated, in a friction spring unit in which a friction spring has a plurality of inner rings and outer rings cooperating with one another by their conical surfaces, an outer casing element outwardly surrounds the outer rings, and an inner casing element inwardly shields the inner rings, whereas each ring located at a respective one of axial ends of the friction spring is sealingly connected with a respective one of the end portions of the outer casing element and the inner casing element. More particularly, the inner casing element shields an inner circumferential surface of the inner rings, and the outer casing element surrounds an outer circumferential surface of the outer rings. The end portions of the outer and inner casing element are sealingly connected, as a rule, with two inner rings.

In accordance with another feature of the present invention, an especially simple and compact construction of the casing elements is provided when the inner casing element and/or the outer casing element are formed as hoses which are constituted by an elastically expansible material and, being connected to the friction spring, are prestressed in the longitudinal direction of the latter even when the friction spring is in maximum loaded condition. The above-mentioned prestress guarantees that no folds appear on the hoses when the spring is loaded to a maximum extent. In order to connect the hoses, conventional means may be utilized, such as tension bands, hose clips, slotted spring sleeves, or a connection similar to tubeless tires known in motor vehicles.

An especially compact construction of the friction spring unit is attained when the inner casing element and/or the outer casing element are formed as two sleeves which are telescopably movable in one another and constituted of metal or a synthetic plastic material.

In accordance with still another feature of the present invention, the sleeves have cooperating collars which limit axial outward movement of the friction spring, and this connection is elastically expansible and compressible during assembling of the sleeves with one another. It has been shown from experiments that such a connection of the sleeves guarantees high resistance to a pulling force, so that only by this connection a prestressing force of the friction spring can be provided. This means that pulling cups which are generally utilized for this purpose (as disclosed, for example, in the German Offenlegungsschrift No. 2,707,358) can be omitted.

In order to provide for the smallest possible dimensions of the sleeves and to guide the friction spring over an especially large surface so as to prevent buckling, a further feature of the present invention is that the walls of the sleeves are formed as hollow spline shafts which are telescopably guided in one another.

Still a further feature of the present invention is also connected with the guidance of the friction spring and consists in that the sleeves of the inner casing elements has means for reinforcing the same so that these sleeves can withstand radially applied forces. This means may be formed by special formations provided on the sleeves, such as flanges, or by constructing the sleeves so that they are massive.

Yet another feature of the present invention is that the sealing connection between the inner rings of the friction spring and the casing elements such as hoses or sleeves, is performed by grooves and beads engageable in the grooves, or by flange-like projections which are received in respective supports. The above-mentioned formations are closely engageable in one another.

The advantages which are provided by the inventive friction spring unit are that the friction springs are reliably protected from dust and moisture, so that advantageous properties of the spring are available during long and maintenance-free service life. Since the outer diameter of the casing elements can only insignificantly exceed the outer diameter of the friction spring, the friction spring unit does not require a substantially larger space. This is especially important when the friction spring unit is to be installed into a predetermined space (for example, in sleeve buffers).

The application of the inventive friction spring unit is further advantageous in connection with spring devices (such as for example disclosed in the German Auslegeschrift No. 1,455,238) which are generally utilized by the American Association of Railways (A.A.R.). Such spring devices have a housing closed at its one side, and a friction element at its open side including a friction shoe and a central wedge-formed member. In this case, the inventive friction spring unit replaces an existing helical spring or rubber spring of these spring devices. Thereby, the loading capacity and the absorption power of these spring devices are increased, and penetration of the lubricant of the friction spring toward the lubricant-free operating friction element is reliably prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS:

A friction spring unit in accordance with the invention includes a friction spring which has a plurality of inner rings 1 and outer rings 3. The inner rings 1 and the outer rings 3 have conical surfaces which cooperate with each other with application of a suitable lubricant, such as a grease. The friction spring is shielded by an inner casing element 2 located adjacent to an inner cylindrical circumferential surface of the inner rings 1, and an outer casing element 4 located adjacent to an outer cylindrical circumferential surface of the outer rings 3.

Figure 1:
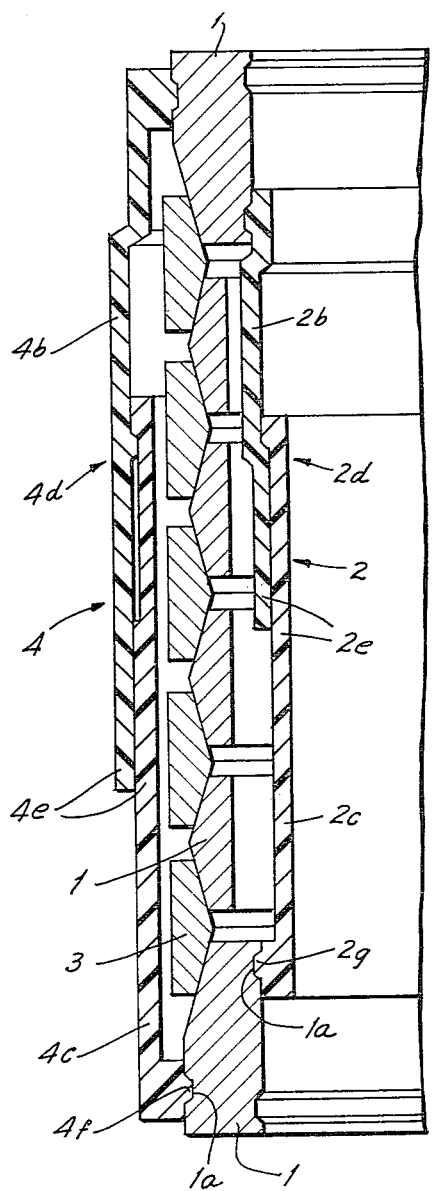
FIGS. 1-3 and 5-8 are views showing longitudinal sections of a friction spring unit in accordance with several embodiments of the present invention.
Figure 2:
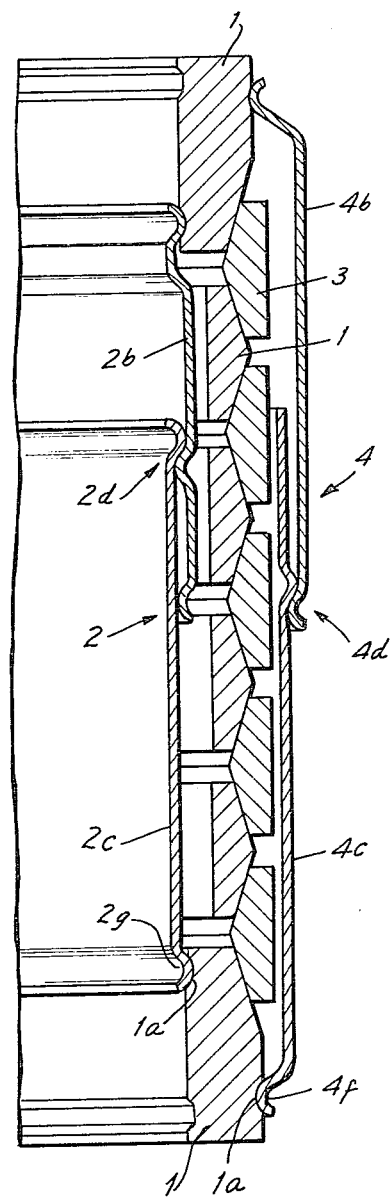

As can be seen from FIGS. 1 and 2, the inner casing element 2 and the outer casing element 4 is composed of two sleeves 2b and 2c or 4b and 4c, respectively, which sleeves are telescopable in one another. The sleeves are constituted of a synthetic plastic material or of a metal, for example, a metal sheet. The inner rings 1 located at axial ends of the friction spring are sealingly connected with an end portion of a respective one of the sleeves by closely interengaging formations. As can be seen from the drawing, this connection may be performed by beads 2g of the sleeves 2b and 2c of the inner casing element 2 or beads 4f of the sleeves 4b and 4c of the outer casing element 4, which beads are engageable in grooves 1a of the inner rings 1. The above-described connection is provided in the elastic region of material so that during mounting of the sleeves they can be expanded and compressed.

In order to form the friction spring as a ready-to-install prestressed unit, the sleeves 2b and 2c as well as the sleeves 4b and 4c are connected with one another by cooperating collars 2d and 4d, respectively. The collars act in the direction of prestress of the friction spring as means for preventing outward displacement of the latter. This connection also provides during the mounting, elastic expansion and compression of the sleeves and additional compression of the friction spring. Relatively large overlapping in the longitudinal direction of the friction spring, particularly the overlapping of the sleeves 2b and 2c or 4b and 4c shown in FIG. 1, guarantees especially stable guidance of the sleeves.

Figures 3, 4:
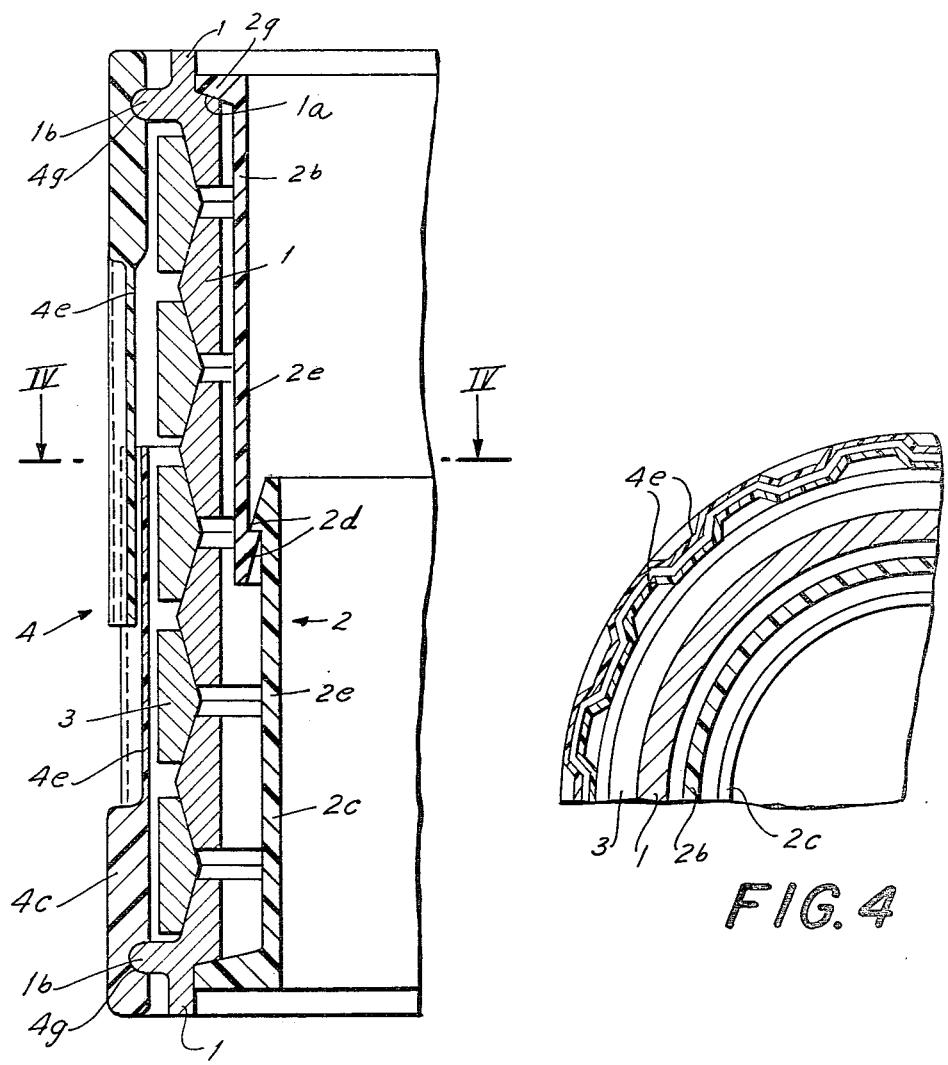
FIG. 4 is a view showing a section taken along the line IV—IV of FIG. 3.

In the friction spring unit shown in FIGS. 3 and 4, walls 4e of the sleeves 4b and 4c of the outer casing element 4 are formed as hollow spline shafts and respectively telescoped in one another. Thereby, the sleeves have very small dimensions, but at the same time, guidance over an especially large surface is provided so as to counteract buckling of the friction spring. The sleeves 4b and 4c are further formed with supports 4g for receiving flange-like projections 1b of the inner rings 1 at the ends of the friction spring. As can be seen from these Figures, the connection of the sleeves 2b and 2c of the inner casing element 2 corresponds to that shown in FIG. 1. However, in contrast to the latter, the sleeves 2b and 2c are chamfered in the regions of the collars 2d of their walls 2e so as to facilitate assembling of the sleeves.

Figure 5:
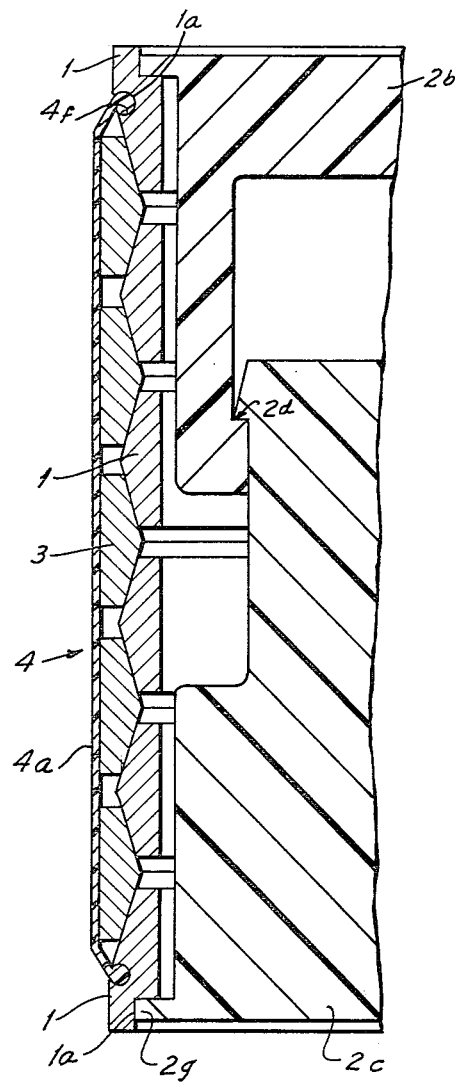
Figure 6:
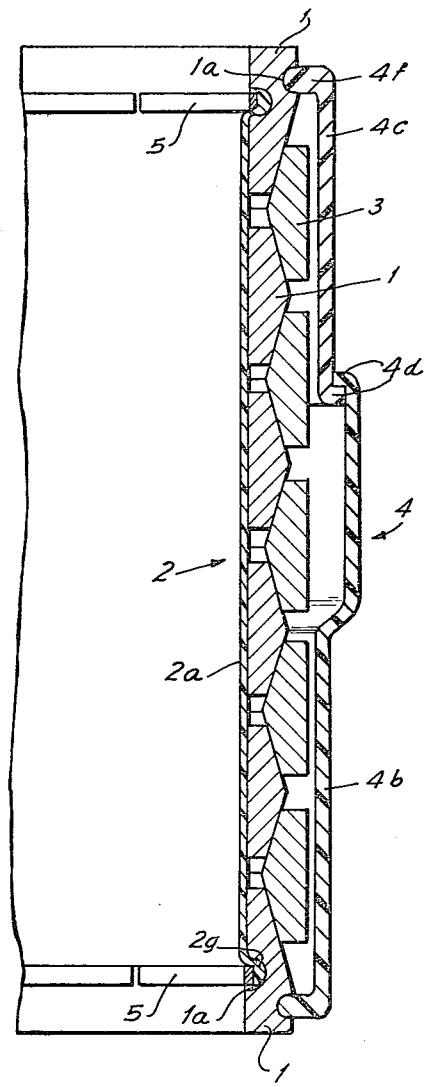

In the friction spring unit shown in FIGS. 5 and 6, the outer casing element 4 (FIG. 5) and the inner casing element 2 (FIG. 6) are formed as hoses 4a or 2a, respectively, constituted of an elastically expansible material. Beads 4f and 2g are provided at the ends of the hoses 4a and 2a, respectively, and engaged in respective grooves 1a of the inner rings 1 of the friction spring. In addition to this, the hose 2a of FIG. 6 is held by a slotted spring sleeve 5. The sleeves 2b and 2c of the inner casing element 2 of FIG. 5 are especially massive and can take up high radial compression forces. The construction of the outer casing element 4 of FIG. 6 corresponds to that shown in FIG. 1.

Figure 7:
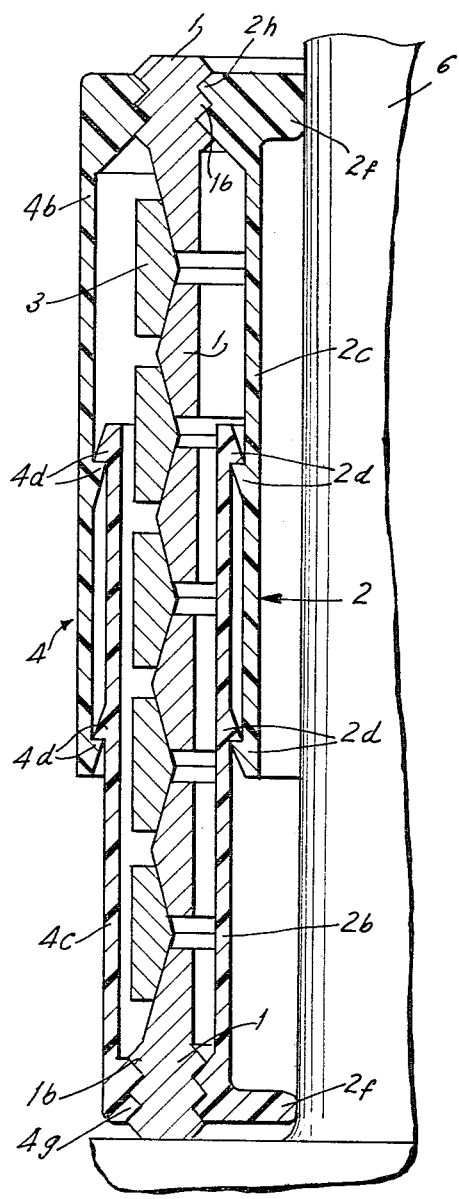

In the friction spring unit shown in FIG. 7 the connection of the casing elements 2 and 4 by the collars 2d and 4d of FIG. 1 is doubled so that it can take up a higher longitudinal force for a greater prestressing of the friction spring. In order to sealingly connect the sleeves 2b and 2c or 4b and 4c, the inner rings 1 located at the ends of the friction spring have flange-like projections 1b which are closely surrounded by supports 2h or 4g provided on the sleeves of the casing elements 2 and 4. The sleeves 2b and 2c of the inner casing element 2 are further provided with inwardly extending flanges 2f which serve for reinforcement and abut against an inner round body 6. The round body 6 is, in this case, a pulling rod of a pulling arrangement of a rail vehicle.

Figure 8:
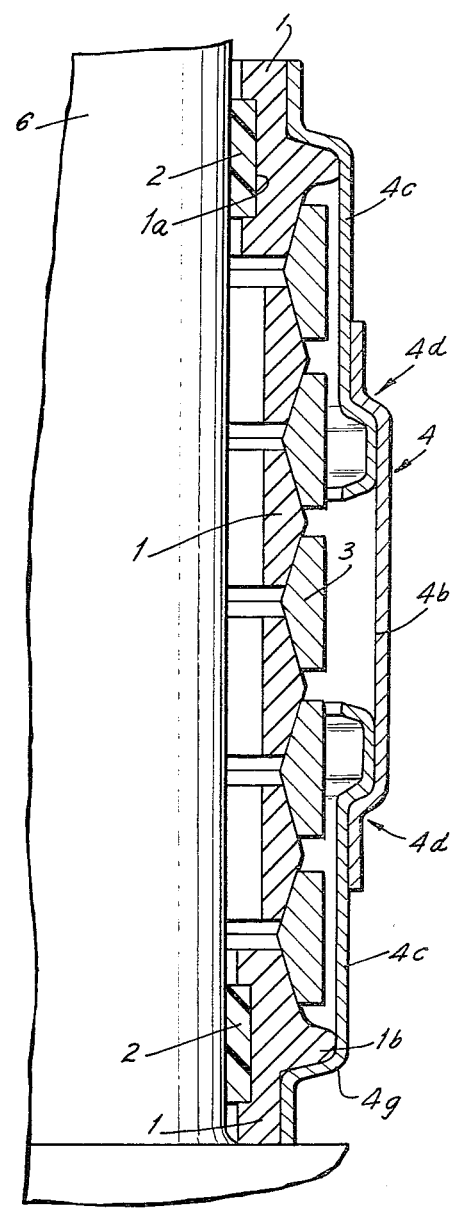

As can be seen from FIG. 8, the outer casing element 4 is composed of three sleeves 4b and 4c. The inner casing element is constructed as sliding packing sleeves. The latter are received in the grooves 1a of respective inner rings 1 of the friction spring and abut against the round body 6.

Figure 9:
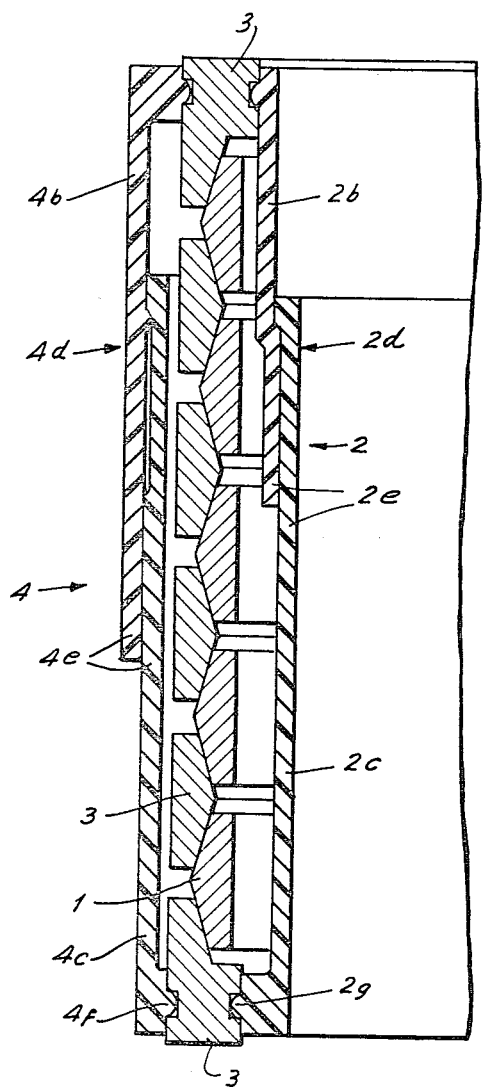
FIG. 9 is a view showing a longitudinal section of the friction spring unit in accordance with a further embodiment of the present invention.

Whereas in the above-described embodiments the casing elements 2 and 4 are sealingly connected with the inner rings 1 of the friction spring, the former may also be sealingly connected with the outer rings 3 of the friction spring in a similar manner, as shown in FIG. 9.

It will be understood that each of the elements described above, or two or more together, may also find a useful application in other types of constructions differing from the types described above.

While the invention has been illustrated and described as embodied in a friction spring unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A friction spring unit, particularly for sleeve buffers or push-pull devices of intermediate buffer couplings of rail vehicles, comprising a friction spring including a plurality of inner rings and outer rings having conical contact surfaces cooperating with one another with interposition of a lubricant, said friction spring having an axis and two axial ends; an inner casing element located inwardly of said inner rings and shielding the latter from inside, said inner casing element having two axially spaced end portions; an outer casing element located outwardly of said outer rings and surrounding the latter from outside, said outer casing element also having two axially spaced end portions, said plurality of rings including two end rings each located at a respective one of said axial ends of said friction spring and sealingly connected with a respective one of said end portions of said inner casing element and said outer casing element; at least one of said casing elements being composed of two sleeves which are telescopable in one another; and means for connecting said sleeves with one another and including two collars each provided on a respective one of said sleeves and cooperating with one another so as to limit an axial outward displacement of said friction spring, said connecting means being elastically deformable so as to allow expansion and compression of said sleeves during their connecting with one another.

2. A friction spring unit as defined in claim 1, wherein said conical surfaces of said inner rings and said outer rings cooperate with one another with interposition of a grease.

3. A friction spring unit as defined in claim 1, wherein said inner rings have inner cylindrical circumferential surfaces and said outer rings have outer cylindrical circumferential surfaces, said inner casing element shielding the inner circumferential surfaces of said inner rings, whereas said outer casing element surrounds the outer circumferential surfaces of said outer rings.

4. A friction spring unit as defined in claim 1, wherein said two rings are inner rings.

5. A friction spring unit as defined in claim 1, wherein at least one of said casing elements is formed as a hose which is constituted by an elastically expansible material and prestressed in an axial direction even when said friction spring is in maximum loaded condition.

6. A friction spring unit as defined in claim 1, wherein said sleeves are constituted of metal.

7. A friction spring unit as defined in claim 1, wherein said sleeves are constituted of a synthetic plastic material.

8. A friction spring unit, particularly for sleeve buffers or push-pull devices of intermediate buffer couplings of rail vehicles, comprising a friction spring including a plurality of inner rings and outer rings having conical contact surfaces cooperating with one another with interposition of a lubricant, said friction spring having an axis and two axial ends; an inner casing element located inwardly of said inner rings and shielding the latter from inside, said inner casing element having two axially spaced end portions; and an outer casing element located outwardly of said outer rings and surrounding the latter from outside, said outer casing element also having two axially spaced end portions, said plurality of rings including two end rings each located at a respective one of said axial ends of said friction spring and sealingly connected with a respective one of said end portions of said inner casing element and said outer casing element, at least one of said casing elements being composed of two sleeves which are telescopable in one another, said sleeves including an inner sleeve and an outer sleeve, said inner sleeve having means for reinforcing the same so as to withstand radial forces.

9. A friction spring unit as defined in claim 8, wherein said inner sleeve is massive so as to form said reinforcing means.

10. A friction spring unit as defined in claim 8, wherein said inner sleeve is provided with reinforcing members forming said reinforcing means.

11. A friction spring unit as defined in claim 10, wherein said reinforcing members are flanges.

12. A friction spring unit, particularly for sleeve buffers or push-pull devices of intermediate buffer couplings of rail vehicles, comprising a friction spring including a plurality of inner rings and outer rings having conical contact surfaces cooperating with one another with interposition of a lubricant, said friction spring having an axis and two axial ends; an inner casing element located inwardly of said inner rings and shielding the latter from inside, said inner casing element having two axially spaced end portions; an outer casing element located outwardly of said outer rings and surrounding the latter from outside, said outer casing element also having two axially spaced end portions, said plurality of rings including two end rings each located at a respective one of said axial ends of said friction spring and sealingly connected with a respective one of said end portions of said inner casing element and said outer casing element; and means for sealingly connecting each of said two end rings with a respective one of said end portions of said inner casing element and said outer casing element, said sealingly connecting means including a first formation on each of said two end rings and a second formation on a respective one of said end portions of said inner casing element and said outer casing element, said formations being closely engageable with one another.

13. A friction spring unit as defined in claim 12, wherein one of said formations is a groove and the other of said formations is a bead engageable in said groove.

14. A friction spring unit as defined in claim 12, wherein one of said formations is a flange-like projection and the other of said formations is a support embracing said projection.

15. A friction spring unit, particularly for sleeve buffers or push-pull devices of intermediate buffer couplings of rail vehicles, comprising a friction spring including a plurality of inner rings and outer rings having conical contact surfaces cooperating with one another with interposition of a lubricant, said friction spring having an axis and two axial ends; an inner casing element located inwardly of said inner rings and shielding the latter from inside, said inner casing element having two axially spaced end portions; and an outer casing element located outwardly of said outer rings and surrounding the latter from the outside, said outer casing element also having two axially spaced end portions, said plurality of rings including two end rings each located at a respective one of said axial ends of said friction spring and sealingly connected with a respective one of said end portions of said inner casing element and said outer casing element, at least one of said casing elements being composed of two sleeves which are telescopable in one another, said sleeves being formed as hollow spline shafts telescopably received in one another.

* * * * *